(12) United States Patent
Barnat et al.

(10) Patent No.: US 7,888,413 B2
(45) Date of Patent: Feb. 15, 2011

(54) CRACK RESISTANT LAYER WITH GOOD BINDER FRACTURE ENERGY PROPERTIES AND METHOD OF SELECTING SAME

(75) Inventors: James J. Barnat, Tulsa, OK (US); Phillip Blankenship, Richmond, KY (US); Richard Steger, Broken Arrow, OK (US); Todd Lynn, Bixby, OK (US); Jason Bausano, Broken Arrow, OK (US); Jehna Dent, Broken Arrow, OK (US); Tim McKinney, Jenks, OK (US)

(73) Assignee: Road Science, LLC, Tulsa, OK (US)

( * ) Notice: Subject to any disclaimer, the term of this patent is extended or adjusted under 35 U.S.C. 154(b) by 0 days.

(21) Appl. No.: 12/791,360

(22) Filed: Jun. 1, 2010

(65) Prior Publication Data

US 2010/0240807 A1    Sep. 23, 2010

Related U.S. Application Data

(62) Division of application No. 12/395,365, filed on Feb. 27, 2009.

(51) Int. Cl.
  *C08L 95/00* (2006.01)
  *E01C 7/00* (2006.01)
(52) U.S. Cl. .......................................... 524/59; 404/17
(58) Field of Classification Search .................... 524/59
  See application file for complete search history.

(56) References Cited

U.S. PATENT DOCUMENTS

| | | | |
|---|---|---|---|
| 3,660,324 A | 5/1972 | Onchi | |
| 4,097,868 A | 6/1978 | Borowick | |
| 4,115,335 A | 9/1978 | Reusser et al. | |
| 4,129,541 A | 12/1978 | Marrs et al. | |
| 4,242,246 A | 12/1980 | Maldonado et al. | |
| 4,330,449 A | 5/1982 | Maldonado et al. | |
| 4,997,868 A | 3/1991 | Blanpain et al. | |
| 5,190,998 A | 3/1993 | Fisher | |
| 5,262,240 A | 11/1993 | Dunning et al. | |
| 5,374,672 A | 12/1994 | Chaverot et al. | |
| 5,719,215 A | 2/1998 | Liang et al. | |
| 5,888,289 A | 3/1999 | Hendriks et al. | |
| 5,925,695 A | 7/1999 | Ohtsuka et al. | |
| 6,469,075 B1 | 10/2002 | Butler et al. | |
| 6,830,408 B1 * | 12/2004 | Blankenship et al. | 404/17 |
| 6,979,705 B2 | 12/2005 | McDowell et al. | |
| 7,084,195 B2 | 8/2006 | Suzuki | |
| 7,297,204 B2 * | 11/2007 | Crews et al. | 106/277 |
| 7,479,185 B2 * | 1/2009 | Blankenship et al. | 106/284.01 |
| 7,503,202 B1 | 3/2009 | Kadrmas | |
| 2003/0149140 A1 | 8/2003 | Stephens et al. | |
| 2004/0106705 A1 | 6/2004 | Mulder | |
| 2005/0022696 A1 | 2/2005 | Blankenship et al. | |
| 2005/0145136 A1 | 7/2005 | Butler et al. | |
| 2007/0028802 A1 | 2/2007 | Blankenship et al. | |
| 2007/0049664 A1 | 3/2007 | Partanen | |
| 2008/0060551 A1 | 3/2008 | Crews et al. | |
| 2009/0012214 A1 | 1/2009 | Butler et al. | |
| 2009/0131558 A1 | 5/2009 | Kim et al. | |
| 2009/0182075 A1 | 7/2009 | Kim et al. | |
| 2010/0098930 A1 | 4/2010 | Kadrmas et al. | |

FOREIGN PATENT DOCUMENTS

| | | |
|---|---|---|
| EP | 0446391 | 9/1991 |
| EP | 0561472 | 9/1993 |
| KR | 0830254 | 5/2008 |
| WO | 2005/100479 | 10/2005 |
| WO | 2007051703 | 5/2007 |
| WO | 2010039998 | 4/2010 |

OTHER PUBLICATIONS

Wagoner et al., Society for Experimental Mechanics, vol. 45, No. 3, Jun. 2005.*
Oklahoma Department of Transportation Special Provision for Ultrathin Bonded Wearing Course, Jun. 2, 2004, 7 pages.
Oklahoma Department of Transportation Special Provision for Ultrathin Bonded Wearing Course, Jun. 2, 2004, 7 pages.
New Jersey Department of Transportation 902.03 Open-Graded Friction Course and Modified Open-Graded Friction Course (http://www.state.nj.us/transportation/eng/specs/2007/spec900.shtm#t90202031).

(Continued)

*Primary Examiner*—Ling-Siu Choi
*Assistant Examiner*—Hui Chin
(74) *Attorney, Agent, or Firm*—Head, Johnson & Kachigian, P.C.

(57) ABSTRACT

A method of selecting a crack resistant layer to be applied to an existing surface, the method comprising the steps of: selecting at least one bituminous binder to examine, where the bituminous binder comprises bitumen and one or more polymers, where the one or more polymers include a sufficient amount of conjugated diene such that at least 2.5% of the bituminous binder's weight comprises conjugated diene, preferably at least 3.0%, more preferably at least 3.5%, and most preferably 4.0%; forming at least one bituminous mixture comprising the bituminous binder and an aggregate; testing each bituminous binder for binder fracture energy properties; and selecting a bituminous binder for use in the crack resistant layer. The method may further comprise the steps of testing the bituminous mixture for fatigue properties and selecting the bituminous binder for use in the crack resistant layer based on fatigue properties and binder fracture energy properties, and/or testing the bituminous mixture for fracture energy and selecting the bituminous binder for use in the crack resistant layer based on mixture fracture energy properties and bituminous binder fracture energy properties.

28 Claims, No Drawings

OTHER PUBLICATIONS

Wagoner, Buttlar and Paulino; Disk-shaped Compact Tension Test for Asphalt Concrete Fracture; 2005 Society for Experimental Mechanics; vol. 45, No. 3, Jun. 2005.

Valdez, Deve; U.S.P.T.O Office Action for U.S. Appl. No. 12/395,318; A Crack Resistant Layer With Good Beam Fatigue Properties and Method of Selecting Same, Nov. 25, 2009, pp. 1-9; United State Patent and Trademark Office.

Wilkinson, Cassandra, Amendment to U.S. Appl. No. 12/395,318; A Crack Resistant Layer With Good Beam Fatigue Properties and Method of Selecting Same, Feb. 11, 2010, pp. 1-22; Head, Johnson & Kachigian, P.C.

Valdez, Deve; U.S.P.T.O Office Action for U.S. Appl. No. 12/365,318; A Crack Resistant Layer With Good Beam Fatigue Properties and Method of Selecting Same, Jun. 7, 2010, pp. 1-12, United States Patent and Trademark Office.

Wilkinson, Cassandra, Amendment to U.S. Appl. No. 12/395,318; A Crack Resistant Layer With Good Beam Fatigue Properties and Method of Selecting Same, Sep. 7, 2010, pp. 1-16; Head, Johnson & Kachigian, P.C.

Szekely, Peter; U.S.P.T.O Office Action for U.S. Appl. No. 12/395,472; A Crack Resistant Layer With Good Beam Fatigue Properties Made From an Emulsion of a Polymer Modified Bituminous Binder and Method of Selecting Same; May 17, 2010, pp. 1-5; United States Patent and Trademark Office.

Wilkinson, Cassandra, Amendment to U.S. Appl. No. 12/395,472; A Crack Resistant Layer With Good Beam Fatigue Properties Made From an Emulsion of a Polymer Modified Bituminous Binder and Method of Selecting Same; Aug. 17, 2010; pp. 1-22; Head, Johnson & Kachigian, P.C.

Szekely, Peter; U.S.P.T.O Office Action for U.S. Appl. No. 12/395,472; A Crack Resistant Layer With Good Beam Fatigue Properties Made From an Emulsion of a Polymer Modified Bituminous Binder and Method of Selecting Same; Aug. 25, 2010; pp. 1-5; United States Patent and Trademark Office.

Ilkinson, Cassandra, Amendment to U.S. Appl. No. 12/395,472; A Crack Resistant Layer With Good Beam Fatigue Properties Made From an Emulsion of a Polymer Modified Bituminous Binder and Method of Selecting Same; Oct. 25, 2010; pp. 1-21; Head, Johnson & Kachigian, P.C.

Szekely, Peter; U.S.P.T.O Office Action for U.S. Appl. No. 12/395,203; Crack Resistant Layer With Good Mixture Fracture Energy Properties and Method of Selecting Same; Mar. 26, 2010; pp. 1-5; United States Patent and Trademark Office.

Wilkinson, Cassandra, Amendment to U.S. Appl. No. 12/395,203; Crack Resistant Layer With Good Mixture Fracture Energy Properties and Method of Selecting Same; Jun. 25, 2010; pp. 1-16; Head, Johnson & Kachigian, P.C.

Zekely, Peter; U.S.P.T.O Office Action for U.S. Appl. No. 12/395,203; Crack Resistant Layer With Good Mixture Fracture Energy Properties and Method of Selecting Same; Jul. 14, 2010; pp. 1-5; United States Patent and Trademark Office.

Wilkinson, Cassandra, Amendment to U.S. Appl. No. 12/395,203; Crack Resistant Layer With Good Mixture Fracture Energy Properties and Method of Selecting Same; Oct. 5, 2010; pp. 1-17; Head, Johnson & Kachigian, P.C.

Zekely, Peter; U.S.P.T.O Office Action for U.S. Appl. No. 12/395,303; Crack Resistant Layer With Good Mixture Fracture Energy Properties Made From an Emulsion of a Polymer Modified Bituminous Binder and Method of Selecting Same; Mar. 26, 2010; pp. 1-5; United States Patent and Trademark Office.

Wilkinson, Cassandra, Amendment to U.S. Appl. No. 12/395,303; Crack Resistant Layer With Good Mixture Fracture Energy Properties Made From an Emulsion of a Polymer Modified Bituminous Binder and Method of Selecting Same; Jun. 25, 2010; pp. 1-16; Head, Johnson & Kachigian, P.C.

Zekely, Peter; U.S.P.T.O Office Action for U.S. Appl. No. 12/395,303; Crack Resistant Layer With Good Mixture Fracture Energy Properties Made From an Emulsion of a Polymer Modified Bituminous Binder and Method of Selecting Same; Jul. 13, 2010; pp. 1-4; United States Patent and Trademark Office.

Wilkinson, Cassandra, Amendment to U.S. Appl. No. 12/395,303; Crack Resistant Layer With Good Mixture Fracture Energy Properties Made From an Emulsion of a Polymer Modified Bituminous Binder and Method of Selecting Same; Oct. 5, 2010; pp. 1-18; Head, Johnson & Kachigian, P.C.

Chin, Hui; U.S.P.T.O. Office Action for U.S. Appl. No. 12/395,365; A Crack Resistant Layer With Good Binder Fracture Energy Properties and Method of Selecting Same; Aug. 5, 2010; pp. 1-11; United States Patent and Trademark Office.

Zekely, Peter; U.S.P.T.O Office Action for U.S. Appl. No. 12/395,203; Crack Resistant Layer With Good Mixture Fracture Energy Properties and Method of Selecting Same; Oct. 20, 2010; pp. 1-5; United States Patent and Trademark Office.

International Search Report for PCT/US2010/024897; Patent Cooperation Treaty, Sep. 13, 2010; pp. 1-7.

International Search Report for PCT/US2010/025079; Patent Cooperation Treaty, Sep. 15, 2010; pp. 1-6.

* cited by examiner

CRACK RESISTANT LAYER WITH GOOD BINDER FRACTURE ENERGY PROPERTIES AND METHOD OF SELECTING SAME

CROSS-REFERENCE TO PENDING APPLICATIONS

This application is a divisional application of U.S. patent application Ser. No. 12/395,365, filed Feb. 27, 2009, entitled "A Crack Resistant Layer With Good Binder Fracture Energy Properties and Method of Selecting Same".

BACKGROUND OF THE INVENTION

1. Field of the Invention

The present invention relates to a crack resistant layer with good binder fracture energy properties and a method of selecting same. More particularly, the present invention relates to a bituminous binder with a critical amount of conjugated diene, which allows for enhanced binder fracture energy properties in a crack resistant layer.

2. Description of the Related Art

When pavements deteriorate, they may be overlaid with hot mix asphalt (HMA) to repair them. When designing an overlay, the rate of crack propagation through the overlay, the rate of deterioration of the reflective crack, and the amount of water that can infiltrate through the cracks must be considered. One disadvantage with such HMA overlays is that cracks in the old pavement reflect through the new overlay. To relieve this reflective cracking, thicker overlays may be placed. Another disadvantage with these overlays is that they typically have a low strain tolerance and a low resistance to reflective cracking. To improve traditional HMA overlays, asphalt binders that display the ability to undergo creep or stress relaxation at low temperatures may be used. Such bituminous binders minimize the potential for thermal and reflective cracking. However, the disadvantage with such bituminous binders is that they are highly ductile and have a low shear modulus at high temperatures, and thus roads created with them tend to rut. Asphalts with high shear modulus that resist rutting at high temperatures may also be used. However, such binders tend to be brittle at low temperatures, and thus roads created with them tend to crack. Typical asphalt bituminous binders formulated for pavement applications usually display either high shear modulus at high temperatures or high ductilities at low temperatures but not both.

A typical highway HMA surface mixture has about 3% to 5% air voids and a fatigue life of only about 500 cycles when tested at 15° C. with a strain amplitude of 2,000 microstrains and frequency of 10 Hz using a 4-point bending beam apparatus. The best surface mixture with about 3% to 5% air voids has a fatigue life of only about 2,000 to 5,000 cycles when tested at 15° C. with a strain amplitude of 2,000 microstrains and frequency of 10 Hz using a 4-point bending beam apparatus. Other mixtures with air voids greater than 5% to 7% may have a fatigue life of only about 500 to 1,500 cycles when tested at 15° C. with a strain amplitude of 2,000 microstrains and frequency of 10 Hz using a 4-point bending beam apparatus.

Blankenship et al., U.S. Pat. No. 6,830,408, which is incorporated herein by reference, attempts to solve the foregoing problems through the use of an interlayer that is placed on the cracked road underneath the overlay. The interlayer includes a mixture of aggregate and bituminous binder, preferably polymer modified asphalt, and is used to delay or stop the occurrence of cracking, control crack severity, reduce overlay thickness, and enhance waterproofing capabilities. The interlayer is highly strain tolerant and substantially impermeable.

The bituminous binder used in the interlayer of the '408 patent includes bitumen, one or more polymers, and, optionally, a cross-linking agent to effect vulcanization of the polymer in the bitumen. Limitations on the characteristics of the bituminous binder and interlayer are set forth in the '408 patent. In particular, the '408 patent specifies that the percentage of air voids in the interlayer must be between 2.0% and 4.0%. This produces a flexural beam fatigue performance of at least 100,000 cycles to failure.

The problem with such interlayers is that, in order to get such a fatigue life and retard the progression of reflective cracks in the pavement, these interlayers sacrifice a degree of their load bearing capacity, as measured in the Hveem stabilometer, and typically have Hveem stabilities of about 18-21. In order to compensate for their low stability, these interlayers are placed below the top layers of a pavement structure so that they are not exposed to direct traffic loads. Thicker top layers help to improve the total structural stability but are costly. Still further, the top layers of the pavement structure cannot completely compensate for the low load bearing capacity of the interlayer.

Blankenship et al., U.S. application Ser. No. 10/631,149, which is incorporated herein by reference, attempts to solve this problem through the use of a highly strain tolerant, substantially moisture impermeable, hot mix reflective crack relief interlayer. The interlayer includes a polymer modified bituminous binder mixed with a dense fine aggregate mixture that is made primarily from manufactured sand. This results in increased stability and improved load bearing capacity. Limitations on the characteristics of the bituminous binder and interlayer are set forth in the '149 application. In particular, the '149 application specifies that the percentage of air voids in the interlayer must be between 1.0% and 5.0%, preferably 2.0% to 4.0%, and most preferably about 3.0%. This produces a flexural beam fatigue performance of at least 50,000 cycles to failure, preferably 80,000 and most preferably 100,000.

The problem with this interlayer is that it is impermeable. When such an interlayer is placed on Portland Cement Concrete (PCC) or another paved surface, the interlayer has the potential to trap vapor underneath it. As changes occur in climatic and environmental conditions, this causes the PCC to release moisture or vent. The interlayer then rises, creating a blister. This causes overlays on top of this interlayer also to rise and blister.

Blankenship et al., U.S. Pat. No. 7,479,185, which is incorporated herein by reference, attempts to solve this problem through the use of a layer that remains substantially moisture impervious and retains its ability to retard the formation of reflective cracks while having increased vapor permeability. This layer may be an interlayer, but also may be a base layer or an overlay.

Limitations on the characteristics of the bituminous binder and layer are set forth in the '185 Patent. In particular, the '185 Patent specifies that the percentage of air voids in the layer must be at least 3.0%, preferably at least 4.0%, more preferably at least 4.5%, even more preferably at least 5.0%, and most preferably at least 7.0%. This produces a flexural beam fatigue performance of at least 5,000 cycles to failure, preferably at least 35,000 cycles to failure, and most preferably at least 100,000 cycles to failure. The '185 Patent notes that there is typically an inverse relationship between the air voids in a bituminous mixture and fatigue resistance of that mixture. However, the bituminous mixture of the '185 Patent may be made by creating a very large amount of air voids in an aggregate structure and then filling a large portion of those voids with bitumen. The total amount of air voids is critical. Too many air voids will limit fatigue resistance and too few air voids will compromise permeability.

The problem with the '185 layer is the narrow operating window. The perfect aggregate structure is required to produce the skeletal structure that meets the requirements of fatigue resistance, strength, and permeability. Local aggregates may not be suitable requiring more costly aggregate sources to be used. Tight tolerances at the hot mix plants creates off-specification product that impacts costs. Additionally, a very high asphalt content is required, which increases costs dramatically.

The current art uses mixture volumetric properties and film thickness to achieve acceptable beam fatigue properties. The '408 patent to Blankenship requires air voids in a tight and low range, extremely high binder film thicknesses, and extremely low DP's (dust to effective binder ratio). The '149 application greatly limits aggregate properties to effect acceptable beam fatigue properties. The '185 Patent allows for higher air void content but also requires a higher binder film thickness. Hence, the current art is void of any binder property that affects beam fatigue properties.

In each of the foregoing, polymer is used in the bituminous binder. Methods of preparing polymer modified bitumen is described in Maldonado et al., U.S. Pat. No. 4,242,246, and Maldonado et al., U.S. Pat. No. 4,330,449, both of which are incorporated herein by reference.

Notwithstanding the foregoing, there remains a need for a crack resistant layer with low air voids and good binder fracture energy properties that does not suffer from the drawbacks of the layers of the Blankenship patents and application. Accordingly, it would be desirable to provide a bituminous binder for a crack resistant layer with greater than 1% air voids and binder fracture energy greater than 40 J/m$^2$, that is stable, that does not require special aggregate structure or excessive asphalt content, and that may be used as a base layer, interlayer, or overlay.

SUMMARY OF THE INVENTION

In general, in a first aspect, the present invention relates to a method of selecting a crack resistant layer to be applied to an existing surface, the method comprising the steps of: selecting at least one bituminous binder to examine, where the bituminous binder comprises bitumen and one or more polymers, where the one or more polymers include a sufficient amount of conjugated diene such that at least 2.5% of the bituminous binder's weight comprises conjugated diene, preferably at least 3.0%, more preferably at least 3.5%, and most preferably 4.0%; forming at least one bituminous mixture comprising the bituminous binder and an aggregate; testing each bituminous binder for binder fracture energy properties; and selecting a bituminous binder for use in the crack resistant layer. The testing of the bituminous mixture for binder energy may comprise testing a single edge notch beam tested at 0.1 mm/sec at −30° C., calculated by ASTM D 5045-99 where the dimensions of the single edge notched beam are B=6.0 mm, W=9.5 mm, A=4.9 mm, and L=44.0 mm (all dimensions + or −1%), where the bituminous binder was RTFO aged per AASHTO T-240, and the samples were conditioned at test temperature for 18 to 20 hours before testing which may result in a bituminous binder fracture energy of greater than 40 J/m$^2$, preferably greater than 50 J/m$^2$, and most preferably greater than 60 J/m$^2$.

The method may further comprise the steps of testing the bituminous mixture for fatigue properties and selecting the bituminous binder for use in the crack resistant layer based on fatigue properties and binder fracture energy properties. The testing of each bituminous mixture for fatigue properties may comprise subjecting each bituminous mixture to a flexural beam fatigue test performed at 2,000 microstrains, 10 Hz, and 15° C. per ASTM D 7460-08. Such a flexural beam fatigue test may result in at least 5,000 cycles to failure, preferably at least 10,000 cycles to failure, and most preferably at least 15,000 cycles to failure.

The method may further comprise the steps of testing the bituminous mixture for fracture energy and selecting the bituminous binder for use in the crack resistant layer based on mixture fracture energy properties and bituminous binder fracture energy properties. Testing of the bituminous mixture for fracture energy may comprise subjecting the bituminous mixture to a Semi-Circular Bend Test or a Disc Compact Tension Test. The fracture energy test may be the Disc Compact Tension Test performed at a temperature of −10° C. and a rate of loading of 1.0 mm/min, in accordance with ASTM D 7313-07, and may result in a mixture fracture energy of greater than 600 J/m$^2$, preferably greater than 700 J/m$^2$, and most preferably greater than 800 J/m$^2$. The preferred testing device is an RSA III Dynamic Mechanical Analyzer from TA Instruments, Inc of New Castle, Del.

The method may further comprise the steps of testing the bituminous mixture for permeability and selecting the bituminous binder for use in the crack resistant layer based on binder fracture energy properties and permeability. The bituminous mixture may be tested for permeability in accordance with ASTM D 3637, which may result in permeability greater than 8 cm$^2$.

The bituminous mixture may have a Hveem stability of greater than 21 per ASTM D 1560 and may have greater than 1% air voids. The bituminous binder may further comprise additives, such as cross-linking agents, accelerators, extenders, fluxing agents, or combinations thereof. The aggregate may comprise a hard and inflexible mineral aggregate, a hard and inflexible man-made aggregate, or a combination thereof. The bituminous mixture may further comprise recycled materials, such as reclaimed asphalt pavement, glass, ground rubber tires, ceramics, metals, or mixtures thereof.

In a second aspect, the invention relates to a crack resistant layer having the properties set forth above.

DETAILED DESCRIPTION OF THE PREFERRED EMBODIMENTS

The present invention relates to a bituminous binder for use in a crack resistant layer. The layer may be used to resurface a distressed pavement surface; and may be used as a base layer, an interlayer, or an overlay. Use of such a layer is described in the Description of Related Art section above and in the Blankenship patent and applications. The bituminous binder is such that the crack resistant layer has good binder fracture energy properties. A method of selecting such a bituminous binder is also provided herein.

The layer is formed from a bituminous mixture, which comprises the bituminous binder and an aggregate. The bituminous binder includes bitumen, one or more polymers, and, optionally, other additives, including but not limited to cross-linking, accelerators, extenders, fluxing agents, and/or other similarly appropriate additives suitable for use in bituminous binders.

The polymer used in the bituminous binder may be any elastomer or plastomer suitable for use in bitumen, including but not limited to those described in the Maldonado and Blankenship patents and application, and containing at least a critical amount of conjugated diene. The critical amount of conjugated diene is at least 2.5%, preferably at least 3.0%, more preferably at least 3.5%, and most preferably 4.0%. Such high amounts of conjugated diene have not previously been used in similar layers because of the high cost of such a relatively large polymer content and the difficulty to process. Surprisingly, it has been found that increasing the amount of conjugated diene above the critical amount produces a layer with improved fatigue resistance of any asphalt-aggregate mixture. Thus, the life of the layer is increased, making the layer cost effective despite the large polymer content.

The viscosity of the bituminous binder, one or more polymers, and, optionally, other additives should be less than about 5,000 cP at 135° C., preferably less than about 3,500 cP, and most preferably less than about 2,500 cP. High bituminous binder viscosity requires excessive mix temperatures at the hot mix plant and lay down on the road. Additionally, excessive bituminous binder viscosity may require extraordinary compactive effort on the road and could cause aggregate degradation or excessive air voids in the resulting bituminous mixture.

The aggregate may be hard and inflexible mineral aggregates, such as sand, stone, lime, Portland cement, kiln dust, or mixtures thereof; man made hard and inflexible aggregates, such as wet bottom boiler slag, blast furnace slag, or mixtures thereof; or any other appropriate aggregate. The structure of the aggregate may be any of those described in the Blankenship patent and applications, or may be any other appropriate structure. The aggregate need not include manufactured sand, as required by the '149 Blankenship application.

Recycled materials, such as reclaimed asphalt pavement, glass, ground rubber tires, ceramics, metals, or mixtures thereof, or any other appropriate recycled material may be incorporated into the mixture. Any conjugated diene from a recycled vulcanizate is not considered as part of the bituminous binder and is not included in the critical amount of conjugated diene as part of this invention.

The bituminous mixture formed from the appropriate amount of conjugated diene bituminous binder and the aggregate may meet any local standards for traditional bituminous mixture properties such as VMA, VFA, density, dust to binder ratio, and the like. However, the Hveem stability per ASTM D 1560 should be greater than 21 and the bituminous mixture should have greater than 1% air voids. The bituminous mixture with suitable crack resistance will have a bituminous binder fracture energy of greater than 40 $J/m^2$, more preferably greater than about 50 $J/m^2$, and most preferably greater than about 60 $J/m^2$; a beam fatigue of greater than 5,000 cycles to failure, more preferably at least 10,000 cycles to failure, and most preferably at least 15,000 cycles to failure; and a mixture fracture energy of greater than 600 $J/m^2$, more preferably greater than about 700 $J/m^2$, and most preferably greater than about 800 $J/m^2$.

Generally, the method of selecting the bituminous binder for use in the crack resistant layer involves mixing a bituminous binder and an aggregate to form a bituminous mixture, forming a specimen layer from the bituminous mixture, and testing the bituminous binder to determine binder fracture energy. If the binder fracture energy is sufficient, the bituminous binder is appropriate for use in the crack resistant layer. If not, another bituminous binder must be used with higher conjugated diene content, and the process must begin again. Additionally or alternately, the specimen layer may be tested for beam fatigue. Additionally or alternately, the bituminous mixture may be tested for mixture fracture energy. In both instances, if the additional property tested, namely beam fatigue or mixture fracture energy respectively, is sufficient, the bituminous binder is appropriate for use in the crack resistant layer. If not, another bituminous binder must be used and the process must begin again. The bituminous mixture may also additionally or alternately be tested for permeability, where the bituminous binder is appropriate only if the permeability is sufficient, and if not, another must be selected.

The bituminous binder and aggregate should meet the criteria set forth above, and should be mixed in sufficient quantities that the bituminous mixture meets the criteria set forth above. In particular, the bituminous binder should include a polymer comprising at least 2.5%, preferably at least 3.0%, more preferably at least 3.5%, and most preferably at least 4.0% conjugated diene based on the weight of the polymer modified bitumen. Furthermore, the bituminous binder should be formed in such a way that the viscosity is no more than about 5,000 cP at 135° C., preferably less than about 3,500 cP, and most preferably about 2,500 cP, and the bituminous mixture should be formed in such a way that the specimen layer formed therefrom has at least 1% air voids and a Hveem stability of at least 21.

The bituminous binder may be tested for fracture energy using any appropriate test and any appropriate parameters. For example, when testing a single edge notch beam at 0.1 mm/sec at –30° C. calculated by ASTM D 5045-99 where the preferred dimensions of the single edge notched beam are B=6.0 mm, W=9.5 mm, A=4.9 mm, and L=44.0 mm, where the bituminous binder was RTFO aged per AASHTO T-240, and the samples were conditioned at test temperature for 18 to 20 hours before testing, an appropriate bituminous binder should result in a bituminous binder fracture energy of greater than about 40 $J/m^2$, more preferably greater than about 50 $J/m^2$, and most preferably greater than about 60 $J/m^2$.

The specimen layer may be tested for fatigue, preferably using a beam fatigue test, most preferably using a flexural beam fatigue test. A flexural beam fatigue test determines the number of times a specimen may be flexed before it cracks. The test may be performed using any appropriate parameters. For example, the test may be performed at 2,000 microstrains, 10 Hz, and 15° C. per ASTM D7460-08. An appropriate bituminous binder should result in a layer having at least 5,000 cycles to failure, preferably at least 10,000 cycles to failure, and most preferably at least 15,000 cycles to failure when tested at 2,000 microstrains, 10 Hz, and 15° C. per ASTM D 7460-08.

The bituminous mixture may be tested for mixture fracture energy using any appropriate test, such as a Semi-Circular Bend Test or a Disc Compact Tension Test, and also using any appropriate parameters. For example, when tested using a Disc Compact Tension Test performed at a temperature of –10° C., a rate of loading of 1.0 mm/min, and in accordance with ASTM D 7313-07, an appropriate bituminous binder should result in a bituminous mixture with a mixture fracture energy of greater than about 600 $J/m^2$, more preferably greater than about 700 $J/m^2$, and most preferably greater than about 800 $J/m^2$.

The bituminous mixture may be tested for permeability in accordance with ASTM D 3637, in which case, an appropriate bituminous binder should result in a permeability of greater than about 8 $cm^2$.

Mixture volumetric properties and/or binder film thicknesses do not need to be strictly controlled to achieve desired properties. The system can be optimized by choosing the lowest conjugated diene content that achieved the desired mixture and/or binder properties. The type of mixture, either coarse or fine, large aggregate of small, high or low air voids content, can be brought into acceptable levels of a crack resistant layer by selecting a binder with the appropriate conjugated diene content.

Example 1

Eight polymer modified bituminous binders were created, four by heating a Suncor PG64-22 bituminous binder, adding polymers, mixing sufficiently to disperse the polymers within the bituminous binder, and adding a sufficient amount of sulfur to cross-link. The other four were created by the same process but with Suncor PG58-28 bituminous binder instead of PG64-22 bituminous binder. The polymers used were Solprene 1205 with about 75% conjugated diene, and Solprene 1110L with about 80% conjugated diene available from Dynasol. Binders 1 through 8 are described in Tables 1 and 2.

TABLE 1

Suncor PG 58-28

| Binder | Solprene 1205 | Solprene 1110L | Conjugated Diene |
|---|---|---|---|
| 1 | 0.00% | 0.00% | 0.00% |
| 2 | 1.00% | 1.00% | 1.55% |
| 3 | 2.00% | 2.00% | 3.10% |
| 4 | 3.00% | 3.00% | 4.65% |

TABLE 2

Suncor PG 64-22

| Binder | Solprene 1205 | Solprene 1110L | Conjugated Diene |
|---|---|---|---|
| 5 | 0.00% | 0.00% | 0.00% |
| 6 | 1.00% | 1.00% | 1.55% |
| 7 | 2.00% | 2.00% | 3.10% |
| 8 | 3.00% | 3.00% | 4.65% |

The eight bituminous binders were used to form eight bituminous mixtures, which in turn were used to form eight specimen layers. Mixture gradation and general volumetric properties are set forth in Table 3.

TABLE 3

9.5 mm Mixture

| Gradation | | Mixture Properties | |
|---|---|---|---|
| Sieve (mm) | % Passing | | |
| 12.5 | 100 | Air Voids | 4.0% |
| 9.5 | 100 | Pb | 5.9% |
| 4.75 | 79.1 | VMA | 15.0% |
| 2.36 | 46.6 | VFA | 72.0% |
| 1.18 | 30.4 | DP | 1.2 |
| 0.6 | 19.7 | | |
| 0.3 | 12.5 | | |
| 0.15 | 7.5 | | |
| 0.075 | 5.7 | | |

The layers were tested at 2,000 microstrains, 10 Hz, and 15° C. per ASTM D 7460-08 for beam fatigue. The results are set forth in Table 4:

TABLE 4

| Binder | Beam Fatigue (Cycles) | Conjugated Diene Content |
|---|---|---|
| Suncor PG 58-28 | | |
| 1 | 815 | 0.00% |
| 2 | 2,165 | 1.55% |
| 3 | 4,419 | 3.10% |
| 4 | 26,247 | 4.65% |
| Suncor PG-64-22 | | |
| 5 | 91 | 0.00% |
| 6 | 592 | 1.55% |
| 7 | 523 | 3.10% |
| 8 | 1,994 | 4.65% |

As can be seen from Table 4, a higher percentage of conjugated diene resulted in a higher number of cycles to failure. A logarithmic correlation coefficient ($r^2$) between Beam Fatigue and conjugated diene content was 0.961 and 0.862 for the PG58-28 and PG64-22 binders respectively. The correlation surprisingly demonstrates the positive effect of conjugated diene on beam fatigue properties. If acceptable beam fatigue properties are not achieved, another binder must be chosen with higher conjugated diene content.

Each bituminous layer was tested for mixture fracture energy and was tested at a temperature of −10° C., a rate of loading of 1.0 mm/min, and in accordance with ASTM D 7313-07. The results are set forth in Table 5:

TABLE 5

| Binder | Fracture Energy (J/m$^2$) | Conjugated Diene Content |
|---|---|---|
| Suncor PG 58-28 | | |
| 1 | 699 | 0.00% |
| 2 | 817 | 1.55% |
| 3 | 1,150 | 3.10% |
| 4 | 1,338 | 4.65% |
| Suncor PG-64-22 | | |
| 5 | 434 | 0.00% |
| 6 | 540 | 1.55% |
| 7 | 671 | 3.10% |
| 8 | 1,084 | 4.65% |

A logarithmic correlation coefficient ($r^2$) between Mixture Fracture Energy and conjugated diene content was 0.973 and 0.955 for the PG58-28 and PG64-22 binders respectively. Similarly, the correlation surprisingly demonstrates the positive effect of conjugated diene on mixture fracture energy properties. If acceptable mixture fracture energy properties are not achieved, another binder must be chosen with higher conjugated diene content.

Each Binder was evaluated for Bituminous Binder Fracture Energy and tested 0.1 mm/sec at −30° C. per ASTM D 5045-99 where the bituminous binder was RTFO aged per AASHTO T-240, and the samples were conditioned at test temperature for 18 to 20 hours before testing. The results are set forth in Table 6:

TABLE 6

| Binder | Binder Fracture Energy (J/m²) | Conjugated Diene Content |
|---|---|---|
| Suncor PG 58-28 | | |
| 1 | 9.31 | 0.00% |
| 2 | 33.47 | 1.55% |
| 3 | 46.45 | 3.10% |
| 4 | 75.94 | 4.65% |
| Suncor PG-64-22 | | |
| 5 | 10.70 | 0.00% |
| 6 | 31.69 | 1.55% |
| 7 | 46.15 | 3.10% |
| 8 | 69.28 | 4.65% |

As can be seen from Table 6, a higher percentage of conjugated diene resulted in a higher binder fracture energy. A linear correlation coefficient ($r^2$) between conjugated diene content and Binder Fracture Energy was 0.980 and 0.993 for the PG58-28 and PG64-22 binders respectively. The correlation surprisingly demonstrates the positive effect of conjugated diene on binder fracture energy properties. If acceptable mixture binder fracture energy properties are not achieved, another binder must be chosen with higher conjugated diene content.

Example 2

Four polymer modified bituminous binders were created, each by heating a PG64-22 bituminous binder, adding polymers, mixing sufficiently to disperse the polymers within the bituminous binder, and adding a sufficient amount of sulfur to cross-link. The polymers used were Solprene 1205 with about 75% conjugated diene available from Dynasol and Solprene 411 with about 70% conjugated diene available from Dynasol. The first bituminous binder was a control and contained no conjugated diene. The second bituminous binder contained 1.7% Solprene 1205 and 0.3% Solprene 411, resulting in 1.49% total conjugated diene based on the weight of the polymer modified bituminous binder. The third bituminous binder contained 3.4% Solprene 1205 and 0.6% Solprene 411, resulting in 2.97% total conjugated diene based on the weight of the polymer modified bituminous binder. Finally, the fourth bituminous binder contained 5.1% Solprene 1205 and 0.9% Solprene 411, resulting in 4.46% total conjugated diene based on the weight of the polymer modified bituminous binder. Binders 9 through 12 of are described in Tables 7.

TABLE 7

| | PG 64-22 Bitumen | | |
|---|---|---|---|
| Binder | Solprene 1205 | Solprene 411 | Conjugated Diene Content |
| 9 | 0.00% | 0.00% | 0.00% |
| 10 | 1.70% | 0.30% | 1.49% |
| 11 | 3.40% | 0.60% | 2.97% |
| 12 | 5.10% | 0.90% | 4.46% |

The four bituminous binders were used to form bituminous mixtures, which in turn were used to form eight specimen layers. Mixture gradation and general volumetric properties are set forth in Table 8 and 9.

TABLE 8

| 9.5 mm Mixture | | | |
|---|---|---|---|
| Gradation | | | |
| Sieve (mm) | % Passing | Mixture Properties | |
| 12.5 | 100 | Air Voids | 4.0% |
| 9.5 | 99.6 | Pb | 7.0% |
| 4.75 | 88.7 | VMA | 15.9% |
| 2.36 | 62.5 | VFA | 75.4% |
| 1.18 | 40.4 | DP | 1.1 |
| 0.6 | 23.4 | | |
| 0.3 | 13.3 | | |
| 0.15 | 7.9 | | |
| 0.075 | 6.0 | | |

TABLE 9

| 4.75 mm Mixture | | | |
|---|---|---|---|
| Gradation | | | |
| Sieve (mm) | % Passing | Mixture Properties | |
| 12.5 | 100 | Air Voids | 4.0% |
| 9.5 | 100 | Pb | 6.9% |
| 4.75 | 97.8 | VMA | 15.8% |
| 2.36 | 77.4 | VFA | 75.0% |
| 1.18 | 56.9 | DP | 1.9 |
| 0.6 | 38.5 | | |
| 0.3 | 21.5 | | |
| 0.15 | 11.9 | | |
| 0.075 | 9.9 | | |

Each bituminous layer was tested for mixture fracture energy and was tested at a temperature of −10° C., a rate of loading of 1.0 mm/min, and in accordance with ASTM D 7313-07. The results are set forth in Table 10:

TABLE 10

| | Mixture Fracture Energy (J/m²) | | | |
|---|---|---|---|---|
| Conjugated Diene Content | 0.00% | 1.49% | 2.97% | 4.46% |
| 4.75 mm Mixture | 345 | 438 | 615 | 1,371 |
| 9.5 mm Mixture | 463 | 508 | 1,559 | 2,190 |

A logarithmic correlation coefficient ($r^2$) between Mixture Fracture Energy and conjugated diene content was 0.903 and 0.922 for the 9.5 mm and 4.75 mm mixtures respectively. The correlation not only demonstrates the positive effect of conjugated diene on mixture fracture energy properties, it also demonstrates the ability of the binder alone to control mixture fracture energy by increasing the conjugated diene content until acceptable properties are achieved.

Each Binder was evaluated for Bituminous Binder Fracture Energy and tested 0.1 mm/sec at −30° C. per ASTM D 5045-99 where the bituminous binder was RTFO aged per AASHTO T-240, and the samples were conditioned at test temperature for 18 to 20 hours before testing. The results are set forth in Table 11:

TABLE 11

| Conjugated Diene Content | Binder Fracture Energy (J/m$^2$) |
| --- | --- |
| 0.00% | 23.7 |
| 1.49% | 34.8 |
| 2.97% | 41.8 |
| 4.46% | 48.2 |

As can be seen from Table 11, a higher percentage of conjugated diene resulted in a higher binder fracture energy. A linear correlation coefficient (r$^2$) between conjugated diene content and Binder Fracture Energy was 0.981. The correlation demonstrates the positive effect of conjugated diene on binder fracture energy properties.

Alternate Mixtures

A variety of alternate mixtures may be used to form the crack resistant layer described herein, so long as the amount of conjugated diene and the fatigue properties meet the requirements set forth above, as well as the fracture energy properties if such properties are considered. For example, every state and the Federal Highway Administration have target levels for various types of mixes. These target levels may be used, and the crack resistant properties of the mixture may be optimized by varying the level of conjugated diene content using the method set forth above. The charts below set forth three alternate mixtures, as required by the Texas Department of Transportation (Alternate Mixture #1), the Oklahoma Department of Transportation (Alternate Mixture #2), and the New Jersey Department of Transportation (Alternate Mixture #3).

Alternate Mixture #1
TxDOT Special Specification 3111 Crack Attenuating Mixture

| Sieve Size | % Passing | | |
| --- | --- | --- | --- |
| 2" | — | Target Laboratory-Molded Density, % | 98 * |
| 1½" | — | Binder Content | 6.5% minimum |
| 1" | — | Design VMA, % Minimum | 16.0 |
| ¾" | — | Design VFA, % | 73-76 |
| ½" | — | Dust/Binder Ratio | 0.6-1.6 |
| ⅜" | 98.0-100.0 | Number of Gyrations | 50 |
| #4 | 70.0-90.0 | | |
| #8 | 40.0-65.0 | | |
| #16 | 20.0-45.0 | | |
| #30 | 10.0-30.0 | | |
| #50 | 10.0-20.0 | | |
| #200 | 2.0-10.0 | | |

* % Air Voids = (100 − 98) = 2.0%

Alternate Mixture #2
Oklahoma DOT Special Provision for Ultra Thin Bonded Wearing Course

| Sieve Size | Type A | Type B | Type C |
| --- | --- | --- | --- |
| ¾" | | | 100 |
| ½" | | 100 | 75-100 |
| ⅜" | 100 | 75-100 | 50-80 |
| #4 | 40-55 | 25-38 | 25-38 |
| #8 | 22-32 | 19-27 | 19-27 |
| #16 | 15-25 | 15-23 | 15-23 |
| #30 | 10-18 | 10-18 | 10-18 |
| #0 | 8-13 | 8-13 | 8-13 |
| #100 | 6-10 | 6-10 | 6-10 |
| #200 | 4-6 | 4-6 | 4-6 |
| Asphalt Content | 5.0-6.2 | 4.8-6.2 | 4.6-6.2 |
| Typical Design Air Voids | 9-14% | 9-14% | 9-14% |

Alternate Mixture #3
NJ DOT 902.03 Open-Graded Friction Course (OGFC) and Modified Open-Graded Friction Course

| | Mixture Designations (% Passing) | | |
| --- | --- | --- | --- |
| Sieve Sizes | OGFC - 9.5 mm | MOGFC - 12.5 mm | MOGFC - 9.5 mm |
| ¾" | | 100 | |
| ½" | 100 | 85-100 | 100 |
| ⅜" | 80-100 | 35-60 | 85-100 |
| No. 4 | 30-50 | 10-25 | 20-40 |
| No. 8 | 5-15 | 10-15 | 10-15 |
| No. 200 | 2.0-5.0 | 2.0-5.0 | 2.0-4.0 |
| Minimum asphalt binder, %$^1$ | 5.5 | 5.7 | 6 |
| Minimum % Air Voids, design | 15% | 20% | 18% |
| Minimum lift thickness, design | ¾" | 1¼" | ¾" |
| Fiber Stabilizer, % | 0.4 | 0.4 | 0.4 |
| Ndesign | 50 | 50 | 50 | http://www.state.nj.us/transportation/eng/specs/2007/spec900.shtm#t90202031

From the above description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and claimed.

What is claimed is:

1. A method of producing a crack resistant layer to be applied to an existing surface, the method comprising the steps of:
   (1) developing a formulation for a bituminous mixture according to methods known in the art, where the bituminous mixture comprises a bituminous binder and an aggregate, the bituminous binder comprises bitumen and one or more polymers, and the one or more polymers include a sufficient amount of conjugated diene such that at least 2.5% of the bituminous binder's weight comprises conjugated diene;
   (2) establishing a binder fracture energy criterion;
   (3) forming a sample of the bituminous binder;
   (4) testing the sample for binder fracture energy properties, where binder fracture energy properties are properties the sample displays when subjected to binder fracture energy testing;
   (5) if the binder fracture enemy properties of the sample meet the binder fracture energy criterion, producing the bituminous mixture from the aggregate and the bituminous binder and producing the crack resistant layer from the bituminous mixture; and (6) if the binder fracture energy properties of the sample do not meet the binder fracture energy criterion, reformulating the bituminous binder to have greater conjugated diene and repeating steps 3 through 6.

2. The method of claim 1 where at least 3.0% of the weight of the bituminous binder comprises conjugated diene.

3. The method of claim 1 where at least 3.5% of the weight of the bituminous binder comprises conjugated diene.

4. The method of claim 1 where at least 4.0% of the weight of the bituminous binder comprises conjugated diene.

5. The method of claim 1 where the testing of the sample for fracture energy comprises testing a single edge notch beam tested at 0.1 mm/sec at −30° C., calculated by ASTM D 5045-99 where the dimensions of the single edge notched beam are B=6.0 mm, W=9.5 mm, A=4.9 mm, and L=44.0 mm where the bituminous binder was RTFO aged per AASHTO T-240, and the samples were conditioned at test temperature for 18 to 20 hours before testing.

6. The method of claim 5 where the fracture energy test results in a bituminous binder fracture energy of greater than 40 J/m$^2$ where binder fracture energy is the result of the fracture energy test on the binder.

7. The method of claim 5 where the fracture energy test results in a bituminous binder fracture energy of greater than 50 J/m$^2$ where binder fracture energy is the result of the fracture energy test on the binder.

8. The method of claim 5 where the fracture energy test results in a bituminous binder fracture energy of greater than 60 J/m$^2$ where binder fracture energy is the result of the fracture energy test on the binder.

9. The method of claim 1 further comprising the steps of:
(7) establishing a fatigue performance criterion between steps (2) and (3);
(8) forming a sample of the bituminous mixture between steps (3) and (4);
(9) testing the sample of the bituminous mixture for fatigue properties between steps (4) and (5);
(10) instead of step (5), if the binder fracture energy properties of the sample of the bituminous binder meet the binder fracture energy criterion and the fatigue properties of the sample of the bituminous mixture meet the fatigue performance criterion, producing the bituminous mixture from the aggregate and the bituminous binder and the producing the crack resistant layer from the bituminous mixture; and
(11) instead of step (6), if the binder fracture energy properties of the sample of the bituminous binder do not meet the binder fracture energy criterion or the fatigue properties of the sample of the bituminous mixture do not meet the fatigue performance criterion, reformulating the bituminous binder to have greater conjugated diene and repeating steps (3), (4), (8), (9), (10), and (11).

10. The method of claim 9 where the testing of the sample of the bituminous mixture for fatigue properties comprises subjecting the sample of the bituminous mixture to a flexural beam fatigue test performed at 2,000 microstrains, 10 Hz, and 15° C. per ASTM D 7460-08.

11. The method of claim 10 where the flexural beam fatigue test results in at least 5,000 cycles to failure.

12. The method of claim 10 where the flexural beam fatigue test results in at least 10,000 cycles to failure.

13. The method of claim 10 where the flexural beam fatigue test results in at least 15,000 cycles to failure.

14. The method of claim 1 further comprising the steps of:
(7) establishing a mixture fracture enemy performance criterion between steps (2) and (3);
(8) forming a sample of the bituminous mixture between steps (3) and (4);
(9) testing the sample of the bituminous mixture for fracture energy properties between steps (4) and (5);
(10) instead of step (5), if the binder fracture energy properties of the sample of the bituminous binder meet the binder fracture energy criterion and the mixture fracture energy properties of the sample of the bituminous mixture meet the mixture fracture energy performance criterion, producing the bituminous mixture from the aggregate and the bituminous binder and the producing the crack resistant layer from the bituminous mixture; and
(11) instead of step (6), if the binder fracture energy properties of the sample of the bituminous binder do not meet the binder fracture energy criterion or the mixture fracture energy properties of the sample of the bituminous mixture do not meet the mixture fracture energy performance criterion, reformulating the bituminous hinder to have greater conjugated diene and repeating steps (3), (4), (8), (9), (10), and (11).

15. The method of claim 14 where the testing of the sample of the bituminous mixture for fracture energy comprises subjecting the bituminous mixture to a Semi-Circular Bend Test or a Disc Compact Tension Test.

16. The method of claim 15 where the fracture energy test is the Disc Compact Tension Test and is performed at a temperature of −10° C. and a rate of loading of 1.0 mm/min, in accordance with ASTM D 7313-07.

17. The method of claim 16 where the fracture energy test results in a mixture fracture energy of greater than 600 J/m$^2$ where mixture fracture energy is the result of the fracture energy test on the mixture.

18. The method of claim 16 where the fracture energy test results in a mixture fracture energy of greater than 700 J/m$^2$ where mixture fracture energy is the result of the fracture energy test on the mixture.

19. The method of claim 16 where the fracture energy test results in a mixture fracture energy of greater than 800 J/m$^2$ where mixture fracture energy is the result of the fracture energy test on the mixture.

20. The method of claim 1 further comprising the steps of:
(7) establishing a permeability criterion between steps (2) and (3);
(8) forming a sample of the bituminous mixture between steps (3) and (4);
(9) testing the sample of the bituminous mixture for permeability between steps (4) and (5);
(10) instead of step (5), if the binder fracture energy properties of the sample of the bituminous binder meet the binder fracture energy criterion and the permeability of the sample of the bituminous mixture meet the permeability criterion, producing the bituminous mixture from the aggregate and the bituminous binder and the producing the crack resistant layer from the bituminous mixture; and
(11) instead of step (6), if the binder fracture energy properties of the sample of the bituminous binder do not meet the binder fracture energy criterion or the permeability of the sample of the bituminous mixture do not meet the permeability criterion, reformulating the bituminous binder to have greater conjugated diene and repeating steps (3), (4), (8), (9), (10), and (11).

21. The method of claim 20 where the sample of the bituminous mixture is tested for permeability in accordance with ASTM D 3637.

22. The method of claim 21 where the permeability is greater than 8 cm$^2$.

23. The method of claim 1 where the bituminous mixture has a Hveem stability of greater than 21 per ASTM D 1560.

24. The method of claim 1 where the bituminous mixture has greater than 1% air voids.

25. The method of claim 1 where the bituminous binder further comprises additives.

26. The method of claim 25 where the additives comprise cross-linking agents, accelerators, extenders, fluxing agents, or combinations thereof.

27. The method of claim 1 where the bituminous mixture further comprises recycled materials.

28. The method of claim 1 where the recycled materials are reclaimed asphalt pavement, glass, ground rubber tires, ceramics, metals, or mixtures thereof.

* * * * *